July 10, 1962
C. C. WAUGH ETAL
3,043,140
MASS FLOW METER
Filed July 28, 1958
3 Sheets-Sheet 1
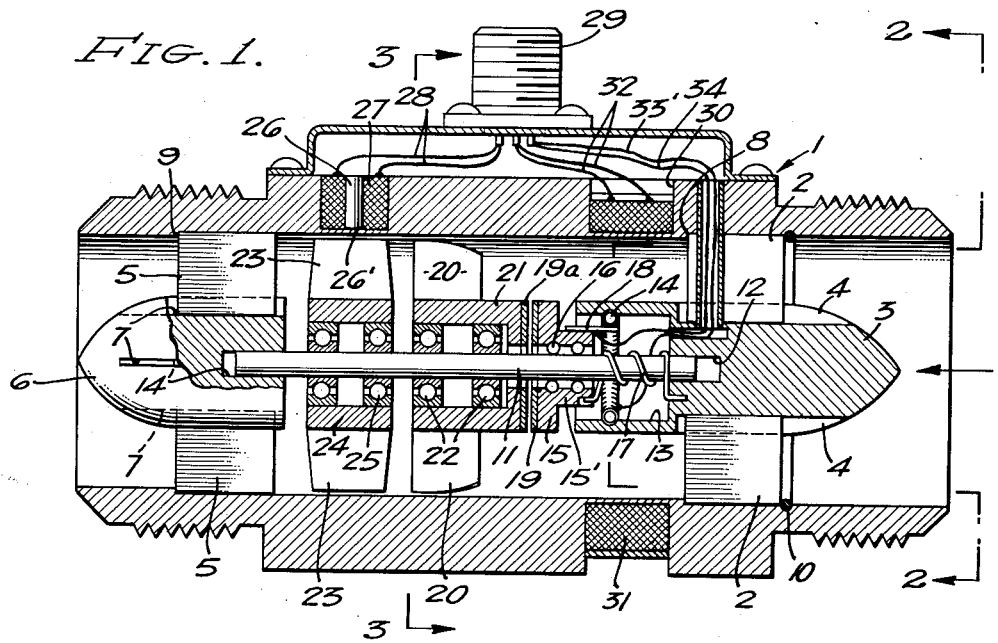
FIG. 1.
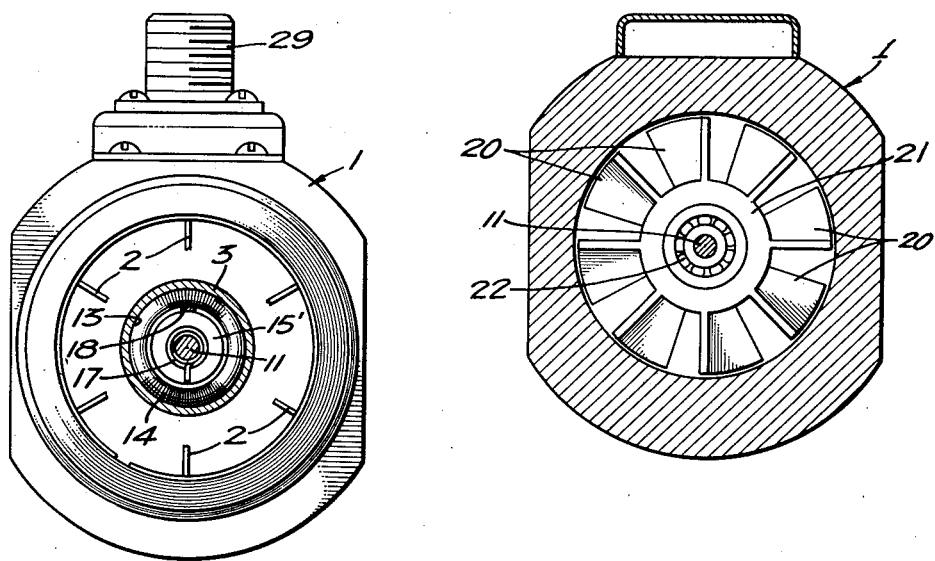
FIG. 2.
FIG. 3.
INVENTORS
CHARLES C. WAUGH
KENNETH R. JACKSON
BY
ATTORNEY

INVENTORS
CHARLES C. WAUGH
KENNETH R. JACKSON
BY
ATTORNEY

July 10, 1962  C. C. WAUGH ETAL  3,043,140
MASS FLOW METER
Filed July 28, 1958  3 Sheets-Sheet 3
FIG. 8.
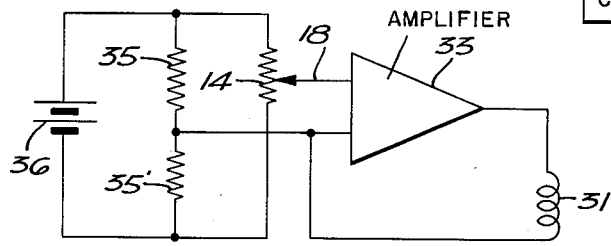
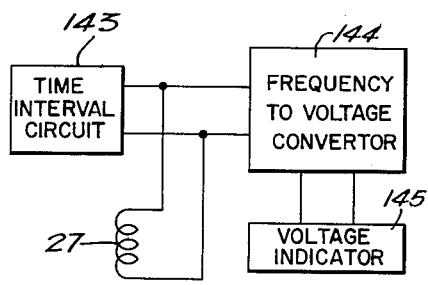
FIG. 9.
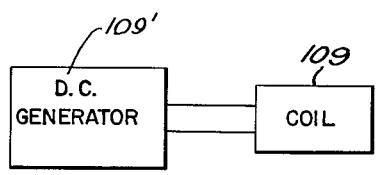
FIG. 10.  FIG. 11.
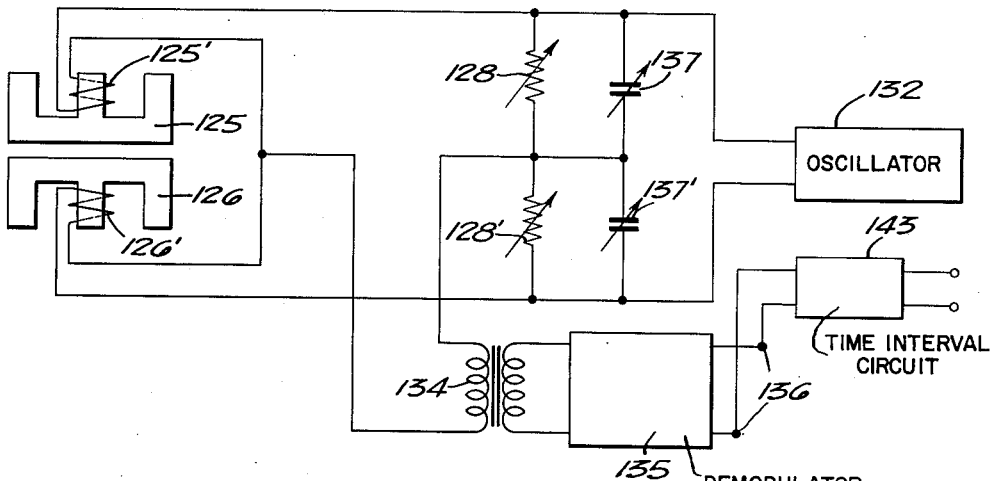
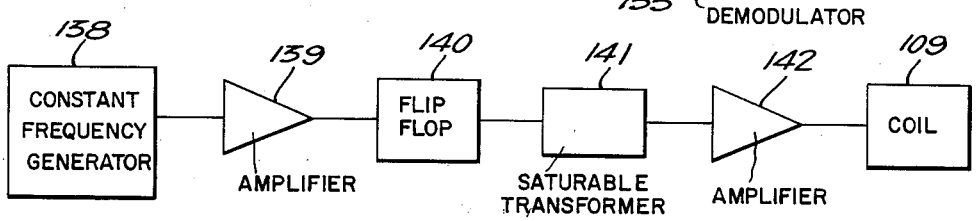
FIG. 12.
INVENTORS
CHARLES C. WAUGH
KENNETH R. JACKSON
BY
ATTORNEY United States Patent Office 3,043,140
Patented July 10, 1962

3,043,140
MASS FLOW METER
Charles C. Waugh, Tarzana, and Kenneth R. Jackson, Los Angeles, Calif., assignors, by mesne assignments, to The Foxboro Company, a corporation of Massachusetts
Filed July 28, 1958, Ser. No. 751,282
14 Claims. (Cl. 73—194)

This invention relates to a mass flow meter which reports the mass rate of flow of fluids, either liquid or gas, or a combination.

Mass flow meters are known in which a fluid traveling in a conduit is given an angular velocity, and a torque meter is provided which is responsive to the fluid angular velocity in terms of a torque produced by the liquid. If "$t$" is the torque, "$w_f$" is the angular velocity of the fluid, "$r$" is the density of the fluid, "$V$" is the lineal axial fluid volume velocity and "$m$" is the mass flow rate, then the torque "$t$" is proportional to the product "$rVw_f$," and since "$m$" is equal to $rV$, the mass flow rate is proportional to the fraction $t/w_f$.

This invention relates to mass flow meters whereby means are provided to control the torque to be constant over the desired range of flow rates for the meter. Thus, if the torque "$t$" is maintained constant, the resultant angular velocity "$w_f$" is inversely proportional to the mass flow rate. Means are provided to measure this angular velocity.

A part of the kinetic energy of linear or axial flow is converted into rotational kinetic energy of the fluid by means of a rotatable means which is rotated by the fluid whereby an angular velocity is imparted to the fluid by exerting a constant drag torque on said rotatable means over the range of variation of flow rates of interest, the resultant fluid angular velocity thus is a measure of the mass flow rate of the fluid.

This result is accomplished by employing an impeller which converts a portion of the axial flow energy into rotational flow energy. Means are also provided to maintain a drag torque on the rotatable means which is substantially constant irrespective of the linear mass flow rate of the fluid.

The specific means of the preferred embodiment of our invention, whereby such rotational energy is imparted to the fluid, is a freely rotating turbine wheel impeller whose blades are so designed that the turbine wheel is turned by the axial flow of the fluid entering the wheel, and thus the fluid exiting from the wheel is given an angular rotation at a rate which is proportional to the mass flow of the fluid entering the turbine wheel impeller. Thus, if $w_f$ is the angular velocity of the fluid and $w_r$ is the rate of rotation of the impeller turned by the fluid and V is the linear volume rate of flow, $w_f+w_r$ is proportional to V. A sensing element is provided in the downstream side of the turbine wheel impeller to sense the angular velocity of the fluid $w_f$.

The torque may be applied by exerting a constant braking torque on the impeller. The magnitude of the torque is entirely independent of the rate of rotation of the impeller or if the torque applied is dependent on the rate of rotation of the impeller, the torque is maintained constant by applying a feed back loop, which corrects the deviations of the braking torque occurring by reason of transient changes in the angular velocity of the impeller. The latter case is illustrated in our preferred embodiment of such devices by means of a friction brake composed of a plurality of frictionally engaging braking elements, the friction being controlled by means of a pressure applying means. To maintain a constant torque, means are provided to sense the variation in frictional drag occurring as a result in changes of the rate of rotation of the impeller resulting from changes in the volume rate of flow. A feed back is employed in the form of a servo-loop which corrects the deviation in frictional drag to establish the original drag torque, and thus to maintain the drag torque constant.

In the preferred embodiment employing means whereby a constant torque is applied, the means for applying the torque being independent of the volume rate of flow, we employ in the preferred embodiment of such case, a hysteresis brake to apply the drag torque to the impeller. In order to generate the braking torque, we apply a magnetic flux density to the hysteresis brake armature by applying the required D.C. current to the field coil of the brake. This creates a substantially constant drag torque which will control the rate of rotation of the turbine wheel impeller. We may provide a means for sensing the magnitude of said torque, and means to sense the angular rotation of the fluid, and means to obtain values which are related to the torque and said angular velocity.

In the friction brake generating means, the brake elements, such as friction plates, are engaged under the influence of a spring which is opposed by connecting one of the elements of the brake to a solenoid so that the pressure is increased or decreased in response to the current passing through the solenoid coil. The element connected to the solenoid will take an angular position with respect to each other proportional to the drag torque exerted by the frictional drag between the plates. This angular displacement is sensed and deviations from a chosen angular position reported as an error signal which is fed back to the solenoid to modify the pressure exerted between the plates and thus to adjust the friction and thus the drag torque to reestablish the chosen drag torque.

In our preferred embodiments, we sense the angular velocity of the fluid by means of a rotor which is turned by the fluid leaving the turbine wheel impeller. The rotor is preferably composed of a plurality of circumferentially spaced radial blades to which a turning torque is applied by the fluid flowing from the turbine wheel as a result of its angular velocity. The rotor is thus caused to rotate at a rate corresponding to the angular velocity of the fluid exiting from the turbine wheel impeller.

In our preferred embodiments we sense the rate of rotation of the rotor by means of an inductive pick-off in which the flux density of a magnetic circuit which is inductively coupled with a field coil, varies as the blades of the rotor pass by the core of the pick-off. This results in a periodic flux density change at a rate equal to the rate at which the blades pass the pick-off, and, therefore, a voltage pulse is generated at the terminals of the coil. The pulse rate is proportional to the angular velocity of the impeller blades.

In our preferred embodiments the turbine wheel impeller is a helical blade freely rotating rotor, while the sensing rotor is a freely rotating rotor formed with flat blades whose planes are radially positioned with respect to the axis of rotation of the impeller.

The control and information circuits for this transducer include means cooperating with the inductive pick-off to generate a voltage pulse at a rate corresponding to the rate of rotation of the impeller.

These and other objects of our invention will be further described in connection with the drawings, of which:

FIG. 1 is a section through one form of the mass flow meter of our invention;

FIG. 2 is a section on line 2—2 of FIG. 1;

FIG. 3 is a section on line 3—3 of FIG. 1;

FIGS. 8, 9, 10, 11 and 12 are schematic diagrams of circuits employed with the mass flow meters.

Figure 4:
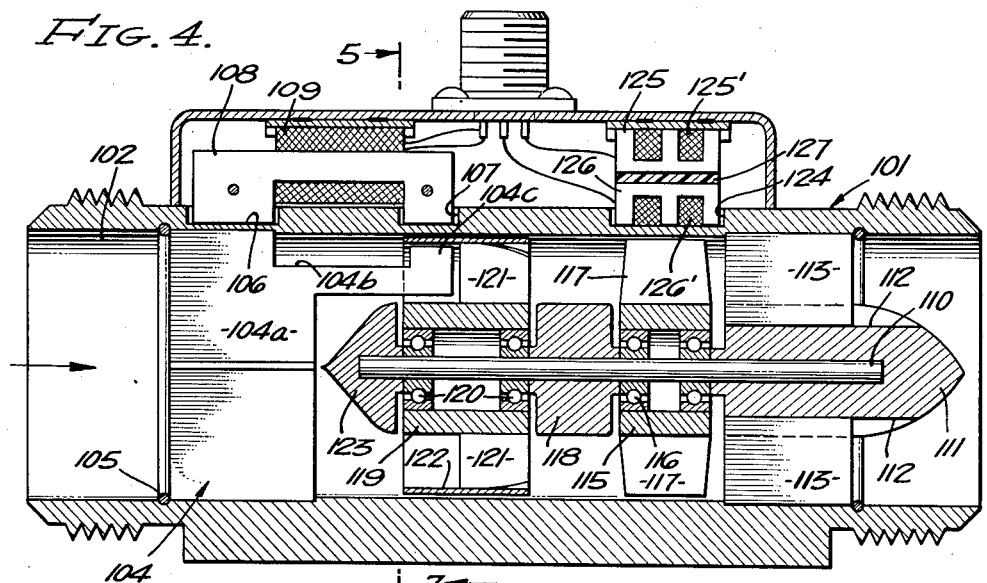
FIG. 4 is a section of another form of the mass flow meter of our invention.

The mass flow meter transducer shown in FIG. 1 consists of a tubular case 1 suitably provided with screw threads or other suitable means for connecting the case with conduits, mounted at each end of the tubular case. The case 1 thus provides a flow channel with an input port at one end and an output port at the other end. The flat radial blades 2 are mounted in the hub 3 which is streamlined towards the upstream side of the flow meter, the fluid entering as shown by the arrow at the right of FIG. 1. The radial blades 2 are positioned in slots 4 in hub 3. At the other end of the flow meter are positioned like flat radial blades 5 mounted in the hub 6 by means of slots 7. The blades 2 abut an internal shoulder 8 and are held in position by a snap ring 10. The flat blades 5 are held frictionally in position against an internal shoulder 9. The blades 2 and 5 are stationary. Mounted in bores 12 and 14' in the hubs 3 and 6 is a stationary axle 11 on which are mounted the bearings 25 fixedly positioned on the shaft 11, on which the hub 24 carrying the flat blades 23 is rotatably mounted. The flat blades 23 are radially positioned and are positioned at equally spaced intervals circumferentially of the hub 24. For purposes of description we will refer to this assembly as the radial blade rotor. It will be understood that other forms of blades may be used to be rotated by the angularly moving fluid to function in a manner similar to the flat blades 23 and these are included in the term radial rotor. Adjacent the bearing 25 is a bearing 22 fixedly mounted on the shaft 11 on which the hub 21 carrying the helical blades 20 is rotatably mounted. The helical blades are positioned at equally spaced intervals about the hub 21. While we prefer to use helical blades, any other geometric configuration which will cause the blades to rotate as is described for the helical blades 20 may be employed. For purposes of distinguishing the rotor, we will refer to the rotor carrying the blades 20 as the helical blade impeller, understanding this term to include equivalent forms of blades. We prefer, however, to employ a blade of helical form for the helical blade rotor and a flat blade for the radial blade rotor. The hub 21 carries a friction disk 19a at one end thereof. A friction disk 19 is mounted on the brake friction disk 15 carried on a hub 15' which is mounted on ball bearings 16 in contact with shaft 11. The hub 15' and the plate 15 are thus slidably and rotationally mounted on the shaft 11. The hub 15' fits into a counter bore 13 in the hub 3. The hub 15' and plate 15 are made of magnetic material such as is used in electromagnetic and solenoid slugs. A toroidally wound resistance coil 14 is mounted on the interior face of the counter bore 13. A finger 18 is mounted on the hub 15' and insulated therefrom and is in electrical contact with the toroid resistance coil 14 which is otherwise insulated from the unit.

A helically wound biasing spring 17 is loosely positioned on the shaft 11 and connected to the hub 15' and the hub 3 so that any angular displacement of the disk 15 about the shaft 11 will impart a torsional tension in the spring 17 to act as a restoring force. Additionally, the spring is in compression and normally holds the disk 19 and 19a in pressure contact. The outer diameter of the hubs 3, 6, 21 and 24, and of the plate 15 are all substantially alike so as not to interfere with the axial flow of the fluid.

In the wall of 1 adjacent hub 24 is a recess provided for a permanent magnet slug 26 around which is positioned a coil 27 inductively coupled with said permanent magnet. The axis of the core is positioned centrally of the blades 23. The housing 1 is of non-magnetic material and thus the base 26' of the recess is made thin, as shown. Mounted in a recess 30 of wall, adjacent the counterbore 13 in hub 3, is a coil 31.

The coil 27 which surrounds the permanent magnet 26 is connected by electrically conducting leads 28 to the connector 29, and the coil 31 is electrically connected by leads 32 to the connector 29, and the wiper 18 is electrically connected by lead 34 and the coil 14 is electrically connected by leads 33' to the connector 29. Resistance 14 and contact 18 thus form an adjustable potentiometer and by means of a D.C. voltage source or battery 36 (see FIG. 8), the angular displacement of the wiper 18 from the rest position when no flow occurs can be converted to a proportional D.C. voltage.

The coil 14 is electrically connected by leads 33' to a D.C. supply and by wiper 18 to a D.C. amplifier 33 and thence to the coil 31. The coil 31 and the hub 15' thus form a solenoid of which the armature is the hub 15'. The intensity of the magnetic field generated by 31 determines the pressure which plate 19 exerts against the friction plate 19a. The magnetic field acting on the hub 15' which is of magnetic material and is magnetically coupled with the coil 31, tends to draw the hub 15' away from the plate 19a against the compression of the spring 17 which tends to hold the plate 19 against the plate 19a.

The coil 27 is connected to any pulse counting device. Thus, as is illustrated in FIG. 9, it may be connected to a frequency-to-voltage converter 144 and the output voltage measured in the voltmeter or other voltage indicating device 145. The voltage is a measure of the pulse rate and, therefore, of the rate of rotation of the blades 23 and, therefore, of the angular velocity of the fluid. A time interval circuit 143 may also be connected to coil 27, as described below.

Such converters are well known (see, for example, page 523, Terman, "Radio Engineering," McGraw-Hill, 3d edition—1947).

The operation of this device will be understood from the foregoing description. When there is no fluid flow through tube 1, the spring 17 exerts a compressive force against 15 and the pressure exerted by plate 19 against plate 19a holds the blades 20 in position without rotation. When flow starts through 1 in a direction of the arrow, the helical blades 20 cause the axial flow of the fluid to exert a tangential pressure against the blades 20 and thus generate a torque. If the helical lead angle L, of the blades 20 is expressed in radians per foot of axial length, then the relative angular velocity of the fluid with respect to the rotor blades will be $w = LV$, where V is the axial velocity of the fluid in feet per second, and it is assumed that there is substantially no fluid leak between the outer edges of the blades 20 and the body 1. If the restraining torque on the rotor due to the friction clutch plate 19a is zero, then the fluid angular velocity will be zero and the rotor angular velocity, $w_r$, will be $w_r = LV$. However, if the friction clutch exerts a restraining torque on the rotor, the fluid will obtain an angular velocity, $w_f$, such that the sum of the absolute values of the rotor velocity and fluid angular velocity will be $w_r + w_f = LV$. The restraining torque on the rotor will be proportional to $w_f rV$ where $r$ is the fluid density. Therefore, the angular fluid velocity, $w_f$, can be controlled by controlling the restraining torque on the rotor.

The fluid, therefore, exits from the blades 20 having a linear velocity and an angular velocity. As the fluid passes the radial flat blades 23 a torque is created causing the blade 23 and the hub 24 to rotate about the axis of the rod 11 with an angular velocity (revolutions per minute) depending upon the angular velocity of the fluid exiting from the turbine blades 20.

The rotor composed of the hub 24 and the blades 23 are of a magnetic material, by which we mean are of relatively high magnetic permeability and not necessarily permanently magnetized. The rest of the structure (other than the hub 15') is formed of non-magnetic material of low permeability. Each time a blade 23 passes by the permanent magnet 26 a change in flux occurs inducing a voltage in the coil 27. This voltage rises and falls at a frequency equal to the frequency at which the blades 23 pass by the core 26. Therefore, the frequency of the current generated in the coil 27 and passing via 28 is proportional to the frequency of rotation of the hub 24 and therefore to the angular velocity of the fluid passing by the blades 23.

It will be observed that the rotation of plate 15 is restrained by the helical spring 17 so that said plate will assume an angular deflection proportional to the applied torque due to the slippage of 19a over 19 and the consequent drag on 19. Thus plate 15 will take an equilibrium position angularly displaced from rest position, i.e., under no flow conditions. This angularly displaced position of the pressure plate 15 is therefore a measure of the torque generated at 21. Means to be more fully described below is employed to maintain a constant drag torque and to sense the mass velocity of the fluid passing through the conduit 1.

Thus, if we set the restraining torque to be a constant value, then the reciprocal angular velocity $w_f$, i.e., $1/w_f$ is proportional to the mass rate of flow and thus the mass rate of flow may be measured by measuring the value of $w_f$.

A computer such as the time interval circuit 143, described hereinbelow, is employed which reports the value of $1/w_f$ corresponding to the angular velocity $w_f$.

The hub 15′ and plate 15 being made of magnetic material, respond as a solenoid to the magnetic field and will be drawn away from the plate 19a with a force that is a function of the magnetic field generated in the coil 31. Thus, it draws the plate 19 away from the plate 19a. The withdrawal of plate 19 relieves the pressure against the plate 19a and permits the blades 20 to rotate more rapidly.

Since on calibration of the instrument a torque is chosen for the operation of the instrument, the position of the wiper for such torque is fixed and is determined by adjusting the bridge (FIG. 8) so that with the wiper 18 at the chosen position on the toroidal coil resistor 14, the bridge composed of resistances 35, 35′ and the potentiometer 14 (FIG. 8) is balanced to produce a steady D.C. current in coil 31. Any deviation in one direction of the position of the wiper to increase the resistance 14 will unbalance the bridge in one direction and increase the coil current, while any deviation to reduce the resistance will unbalance the bridge in the opposite direction to decrease the flow of current through the coil 31 and thus add or subtract from the pressure exerted by the spring 17 and thus permit the resistance change in 14 to be nulled as the torque is re-established in the calibration position. Thus a constant drag torque is maintained on 21.

Referring to FIG. 4, positioned within the tubular case 101 is a set of flow straightening vanes 104. The straightening vanes 104 are positioned at the entrance end 102 of the tubular case 101. The vanes 104 are composed of four mutually perpendicular plates positioned in cruciform form at the entrance 102 of the tubular case 101. One of the vanes, marked 104a, has an extension in which is positioned a notch 104b to form a hook-shaped section marked at 104c (see FIG. 4). The plates 104 are frictionally positioned inside the case and retained by a snap ring 105. The case 101 is squared off at the top and with rectangular notches at 106 and 107, into which is placed a laminated iron core 108 which is C-shaped, the legs of the C's fitting into the notches 106 and 107. The laminated core 108 is inductively coupled with a coil 109 to form an electromagnet for purposes to be later described.

The shaft 110 axially positioned in the case 101 has mounted at one end the nosepiece 111, which is agg-shaped and points downstream in the case. The nosepiece 111 is notched with a series of slots 112 positioned circumferentially of the nosepiece 111, in which slots are positioned four mutually perpendicular plates 113 in cruciform orientation to support said shaft. Mounted upon the shaft 110, on bearing 120, is the freely rotating hub 119 carrying helically shaped blades 121. Mounted adjacent to the hub 119 is a separator 118 rigidly connected to the shaft 110. Mounted adjacent the separator 118 is a hub 115 mounted on bearings 116 to rotate freely on said bearings. Positioned in the hub 115 are a plurality of radial blades 117 of planar form mounted parallel to the axis of the tubular case 101 and positioned circumferentially of the hub 115 with the axis co-planar with each of the blades. Positioned at the end of the shaft 110 and adjacent the straightening vanes 104 is the streamlined cap 123.

The shroud ring 122 is positioned at the ends of the blades 121 and between the hook-shaped end 104c and the inner wall of the tube 101 adjacent the notch 107 in which one end of the C-shaped core 108 is positioned. The end 104c and the adjacent end of the core 108 are pole pieces between which the shroud ring passes on rotation. A notch 124 is positioned in the squared off top of the case 101 opposite the ends of the radial blade 117.

Positioned in the notch 124 are back-to-back E-shaped cores 125 and 126, separated by insulating separator 127. The center leg of each of the E-shaped cores is wound with a coil 125′ and 126′.

Figure 6:
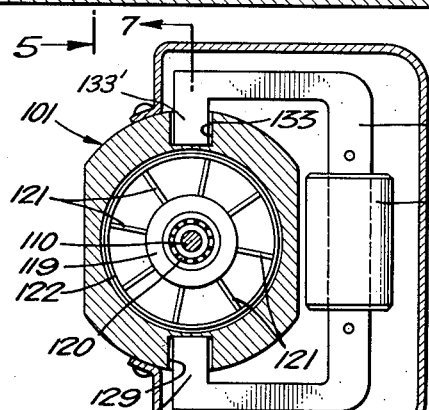
FIG. 6 is a section of a modification of the transducer of FIG. 4 taken on a line of section similar to that of FIG. 5.
Figure 5:
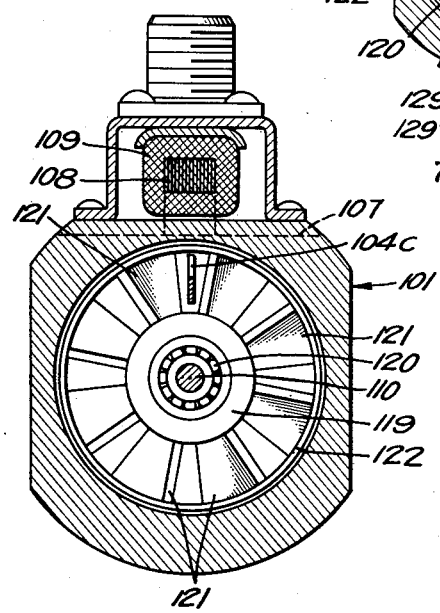
FIG. 5 is a section on line 5—5 of FIG. 4.
Figure 7:
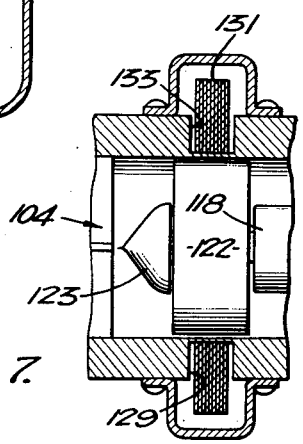
FIG. 7 is a section on line 7—7 of FIG. 6.

FIGS. 6 and 7 show a variation of the positioning of the electromagnet of the hysteresis brake. As shown, the ends of the C-shaped magnet core 131 are positioned in two diametrically opposed notches 129 and 133 adjacent the shroud ring 122. The ends 129′ and 133′ of the core 131 are thus opposed pole pieces between which the shroud ring passes on rotation. The transducer is otherwise constructed as described herein in connection with the form shown on FIGS. 1–5.

A suitable housing may be provided as is shown in FIGS. 1, 3, 4, 5, 6 and 7. The flow meter case 101 may be made of aluminum or other non-magnetic materials such as non-magnetic stainless steel. This is also true of all other portions of the flow meter as indicated above except as follows:

The E-cores of the pick-off coils 125 and 126, and the cores of the electromagnets 108, 104a and 131 are made of laminated iron such as is used in electromagnet cores or transformers. The shroud ring 122 is made of a permanent magnet material such as is usually employed in the rings and armature of hysteresis clutches and motors. The blades 117 are made of material of high magnetic permeability. The hubs, bearings, shafts, straightening vanes, other than 104a, nosepieces, and other portions of the structure are made of non-magnetic material such as stainless steel. By the term non-magnetic, we wish to be understood that the material has a relatively low permeability so that it will not affect the magneic characteristics of the shroud ring 122 of the hysteresis brake, nor of the action of the electromagnets 125 and 126 on the blade 117.

The incoming fluid entering through inlet 102 (FIG. 4) passes by the vanes 104 and 104a, and any inherent rotational energy in the rotational characteristics of the incoming fluid is removed and the fluid exiting from the vanes has substantially entirely a linear velocity with substantially no rotation. In passing by the blades 121 in the hub 119 (herein referred to as the first rotor or impeller), due to their helical conformation, a rotation is imparted to the vanes 121. The fluid exiting from the blades 121 will therefore have an angular velocity dependent on the braking torque applied to the blades 121. As the rotating fluid passes through the blades 117, which blades are positioned in the rotor 115, radially of the axis of the shaft 110, which is axially positioned in the passageway, the blades 117 will be rotated by the fluid at substantially the angular velocity of the fluid entering the blades 117, the frictional drag of the bearings being held down to a minimum. The radial blade rotor is hereinafter referred to as the second rotor. Downstream bullet-shaped member 111 will prevent any violent changes in the fluid flow pattern immediately leaving the second rotor blade 117.

The fins 113 on the downstream side are used to position the nosepiece 111 and will also be of asistance in the action of 111.

The hubs, spacer and the cap 123 and 111 are made of the same exterior diameter to limit the amount of turbulence in the chamber 101 passing by the elements of the torque motor.

The pulse generator illustrated in the transducer of FIG. 4 etc., will, like that shown in FIG. 1, produce a pulse at a rate which is proportional to the rate of rotation of the impeller, as illustrated in FIG. 4 and schematically shown in FIG. 10 in the form of an inductive pick-off. Two identical E cores, 125 and 126, made up of standard transformer iron laminations and mounted back-to-back as described above, have their coils 125' and 126' mounted on the center leg of each of the cores 125 and 126. The coils are connected in an electrical bridge circuit including the resistances 128 and 128' and the trim capacitors 137 and 137'. The bridge is fed by an oscillator 132 and the output of the bridge at 134 is inductively coupled with the demodulator 135 whose output is shown at 136.

The bridge including coils 125' and 126' is balanced by adjusting the resistances 128 and 128' and the capacitors 137 and 137' until the output at 134 is zero, with the oscillator 132 driving the bridge at a fixed frequency. Whenever the bridge is unbalanced, as when a blade 117 passes by the core 126 and the reluctance of the magnetic circuit is decreased, an output voltage will appear at 134 and at the output of the demodulator 136. The carrier frequency of the oscillator 132 is modulated by the frequency generated by the rotation of the blades, which is dependent upon the rate of rotation of blade 117 past the core 126.

The modulated frequency passes through a demodulator 135 inductively coupled with 134 to the output of the bridge, and the output 136 of the demodulator gives voltage pulses at the rate corresponding to the rate of rotation of the blade 117 with negligible reflected torque due to the magnetic circuit coupling between the inductive pick-off and the rotor blade 117.

The drag brake composed of the hysteresis brake shroud 122 and the electromagnet core 109 (FIG. 4 and FIG. 6) acts on the principle of a hysteresis brake. A D.C. current in the coil 109 establishes a magnetic flux density in the magnetic circuit which includes the rotor shroud ring 122 and the pole faces of 108 and 104c (FIG. 4) or in notches 129 and 133 (FIG. 6). As the first rotor turns, the section of the shroud ring 122 positioned between the pole pieces of the core 108 and the member 104c becomes magnetized, and the section leaving these pole pieces returns to its initial magnetic state. Thus, the magnetic state of the shroud ring 122 is cycled through a magnetic hysteresis loop as the rotor moves between the pole pieces 104c and 108 (FIG. 4) or 129' and 133' (FIG. 6). A circumferential magnetic force on the rotor produces a torque which acts in a direction to stop the rotor motion. This torque is proportional to the magnetic flux density produced by coil 109 and is independent of the rotor velocity. By controlling the magnitude of the current in the coil 109, the torque can be controlled.

We may maintain the current flow in coil 109 at a value to establish a substantially complete saturation of magnetic field in the shroud ring at the pole faces. In such case transient small variations in current amplitude will cause substantially no variation in the magnitude of the magnetic flux from the pole pieces through the contiguous portion of the shroud ring. However, as a practical matter the complete saturation of the shroud ring adjacent the pole pieces is difficult and, therefore, we prefer, as a safety measure, to hold the maximum value of the magnetizing current to give as complete saturation as practicable and to maintain the value of current substantially constant at such magnetizing value.

However, should it prove difficult, due to the magnitudes of the currents required to saturate the magnetic circuit, the flux density may be fixed at a lower value and the flux density may be at less than saturation. By maintaining a constant current in the field coil of the hysteresis brake, a constant drag torque will be produced by the hysteresis brake.

While we may employ a non-pulsating constant D.C. current in the coil fed from a constant current D.C. generator 109', as is schematically illustrated in FIG. 11, we may also employ the system shown in FIG. 12. A constant frequency generator 138 generates constant frequency pulses which are amplified in 139 and passed to a flip-flop 140 which passes a square-shaped pulse to the saturable toroidal coil transformer 141 which shapes the pulses into a train of pulses of constant amplitude and constant width in time. These are amplified in 142 and passed to the coil 109. Thus a constant average magnetizing current passes through the coil and a constant average drag torque is obtained.

The pulse rate output from the pulse generator responsive to the angular velocity of the fluid is sensed by a computer shown schematically in FIG. 10. Since the mass flow rate is proportional to the reciprocal of the pulse rate, the computer senses the interval between the pulses which is proportional to the reciprocal of the frequency, i.e., pulse rate. Such time interval circuits, illustrated by the block 143 in the block diagram FIG. 10 are well known, see, for instance, "Pulse and Digital Circuits" by Jacob Millman and Herbant Fant, published by McGraw-Hill 1956. See section 16–10, Time Measurement, pages 508–513.

While we have described particular embodiments of our invention for the purpose of illustration, it should be understood that various modifications and adaptations thereof may be made within the spirit of the invention as set forth in the appended claims.

We claim:

1. A mass flow meter comprising a flow channel including an entrance port and an exit port, rotatable means in said channel rotated by the axial flow of said fluid to impose an angular velocity to said fluid, a hysteresis brake for said rotatable means, said hysteresis brake including an armature mechanically connected to said rotatable means and rotatable therewith, a pair of magnet poles, said armature rotatably mounted to pass between said magnet poles during rotation, an electromagnet magnetically connected to said magnet poles and including a field coil, means to pass a substantially constant average magnetizing current through said field coil whereby a constant braking torque is imposed on said rotatable means, and means to sense the magnitude of said angular velocity of said fluid.

2. In the flow meter of claim 1 said means to impose an angular velocity on said fluid including a helical blade impeller, rotatably mounted in said channel, and said armature including a shroud ring mounted on said helical blade impeller for rotation to pass between said magnet poles on rotation.

3. A mass flow meter as set forth in claim 2, wherein said angular velocity sensing means comprises a radial blade rotor mounted for substantially unrestrained rotation in said channel.

4. A mass flow meter comprising a flow channel including an entrance port and an exit port, rotatable means in said channel rotated by the axial flow of said fluid to impose an angular velocity to said fluid, a hysteresis brake for said rotatable means, said hysteresis brake including an armature mechanically connected to said rotatable means and rotatable therewith, a pair of magnet poles, said armature rotatably mounted to pass between said magnet poles during rotation, an electromagnet magnetically connected to said magnet poles and including a field coil, means to pass a substantially constant magnetizing current through said field coil whereby a braking torque is imposed on said rotatable means, and means to sense the magnitude of the reciprocal of said angular velocity of said fluid.

5. In the mass flow meter of claim 4, said means to impose an angular velocity on said fluid including a helical blade impeller, rotatably mounted in said channel, and said armature including a shroud ring mounted on said helical blade impeller for rotation between said magnet poles.

6. A mass flow meter as set forth in claim 5, wherein said means to sense the reciprocal of the angular velocity includes a radial blade rotor mounted for substantially unrestrained rotation in said channel.

7. A transducer for a fluid mass flow meter comprising a flow channel, said channel including an entrance port and an exit port, rotatable means in said channel rotated in response to the flow of said fluid in said channel and reactive to the linear velocity of said fluid to impart an angular velocity to said fluid, means for applying a constant braking torque to said rotatable means, and means including a radial blade rotor mounted in said channel for sub-stantially unrestrained rotation for measuring the angular velocity of said fluid passing from said rotatable means, the angular velocity as measured by said measuring means thereby indicating the mass flow through said channel.

8. A transducer as set forth in claim 7, wherein said braking torque means includes a braking means and means for adjusting said braking means to obtaining said constant braking torque.

9. A transducer as set forth in claim 8, wherein said measuring means further includes means for sensing the rate of rotation of said radial blade rotor.

10. A transducer as set forth in claim 8, wherein said rotatable means is a helical blade impeller.

11. A transducer as set forth in claim 10, wherein said measuring means further includes means for sensing the rate of rotation of said radial blade rotor.

12. A transducer as set forth in claim 10, and further including means for determining the reciprocal of the rate of rotation of said radial blade rotor.

13. A transducer as set forth in claim 7, wherein said braking means comprises a first brake element connected to said rotatable means, a second brake element supported in braking relation to said first element, means for engaging said elements to impose a braking torque on said rotatable means to control the rotation thereof, and means responsive to the relative displacement of said elements to adjust said displacement to maintain said displacement constant regardless of changes in flow rate.

14. A transducer as set forth in claim 13, wherein said means for engaging said elements comprises a solenoid, the armature of said solenoid being connected to said second element, and said means responsive to relative displacement including means for controlling the current flow through said solenoid.

References Cited in the file of this patent
UNITED STATES PATENTS

| | | |
|---|---|---|
| 1,227,185 | Neuland | May 22, 1917 |
| 2,119,819 | List | June 7, 1938 |
| 2,709,755 | Potter | May 31, 1955 |
| 2,832,218 | White | Apr. 29, 1958 |
| 2,857,761 | Bodge | Oct. 28, 1958 |
| 2,882,727 | Newbold | Apr. 21, 1959 |

FOREIGN PATENTS

| | | |
|---|---|---|
| 744,852 | Great Britain | Feb. 15, 1956 |